United States Patent [19]
Lyon et al.

[11] Patent Number: 5,255,091
[45] Date of Patent: Oct. 19, 1993

[54] DIGITAL TELEVISION STANDARDS CONVERSION

[75] Inventors: David Lyon, Farnham, England; Guy R. Caplin, Otterburn Park, Canada

[73] Assignee: Snell & Wilcox Limited, Waterooville, England

[21] Appl. No.: 720,512

[22] PCT Filed: Oct. 22, 1990

[86] PCT No.: PCT/GB90/01619
§ 371 Date: Aug. 19, 1991
§ 102(e) Date: Aug. 19, 1991

[87] PCT Pub. No.: WO91/06182
PCT Pub. Date: May 2, 1991

[30] Foreign Application Priority Data

Oct. 20, 1989 [GB] United Kingdom ................. 8923649
Mar. 30, 1990 [GB] United Kingdom ................. 9007214

[51] Int. Cl.$^5$ .......................... H04N 7/01; H04N 9/11
[52] U.S. Cl. ...................................... 358/140; 358/11; 358/54; 358/214
[58] Field of Search ................... 358/54, 214, 11, 140, 358/12, 141

[56] References Cited

U.S. PATENT DOCUMENTS

| | | |
|---|---|---|
| 3,582,543 | 6/1971 | Davies et al. . |
| 4,399,465 | 8/1983 | Massmann ............................. 358/54 |
| 4,709,277 | 11/1987 | Ninomiya et al. . |
| 4,876,596 | 10/1989 | Faroupja ................................ 358/11 |
| 4,982,280 | 1/1991 | Lyon et al. ........................... 358/54 |
| 4,998,167 | 3/1991 | Jaqua .................................. 358/140 |
| 5,084,755 | 1/1992 | Ozaki et al. .......................... 358/54 |
| 5,115,311 | 5/1992 | Jaqua .................................. 358/140 |

FOREIGN PATENT DOCUMENTS 2129651 5/1984 United Kingdom .
2176075 12/1986 United Kingdom .
2240232A 7/1991 United Kingdom .

OTHER PUBLICATIONS

Hayes, D., "Vertical-Interval Encoding for the Recordable Laser Videodisc", *SMPTE Journal*, Aug. 1985, pp. 814–820.

C. Pantuso, "Reducing Financial Aliasing in HDTV", *Better Video Images*, Selected papers of 23rd SMPTE Conference in San Francisco, Calif., U.S.A., Feb. 3–4, 1989, SMPTE, White Plains, U.S.A., 1989, pp. 157–169.

T. Reuter, "Multi-Dimensional Adaptive Sampling Rate Conversion", *Proceeding ICASSP '87 Dallas*, Apr. 6–9, 1987, vol. 4/4, IEEE, New York, U.S.A., pp. 1969–1972.

Mankin, E., "Foreign Client Accepts New Video Process", *Electronic Media*, Sep. 19, 1988, p. 28.

Marvin, M., "Doing Eurpope on a Budget With a PAL: Image Translation", *Post*, vol. 3, No. 12, Dec. 1988, pp. 34, 36.

Parisi, P., "Pacific Vid Bows PAL Dub System", *The Hollywood Reporter*, Sep. 13, 1988.

"Pacific Video Acquires UCL, Opens Film Lab", *Back Stage*, May 13, 1988, pp. 49–50.

"Laser-Pacific Granted Patent for Imaging Translation Process", Charles J. Lipow, Inc., News Release, Mar. 9, 1991.

*Primary Examiner*—James J. Groody
*Assistant Examiner*—Michael H. Lee
*Attorney, Agent, or Firm*—Jeffrey H. Ingerman; Morey B. Wildes

[57] ABSTRACT

Film originating NTSC video signals are converted to the PAL standard by a process which detects and eliminates duplicate fields. Video frames corresponding one-for-one with the original film frames are line interpolated to provide a PAL signal with minimal artefacts. Edits are detected and steps taken to avoid interpolations across a cut.

17 Claims, 6 Drawing Sheets

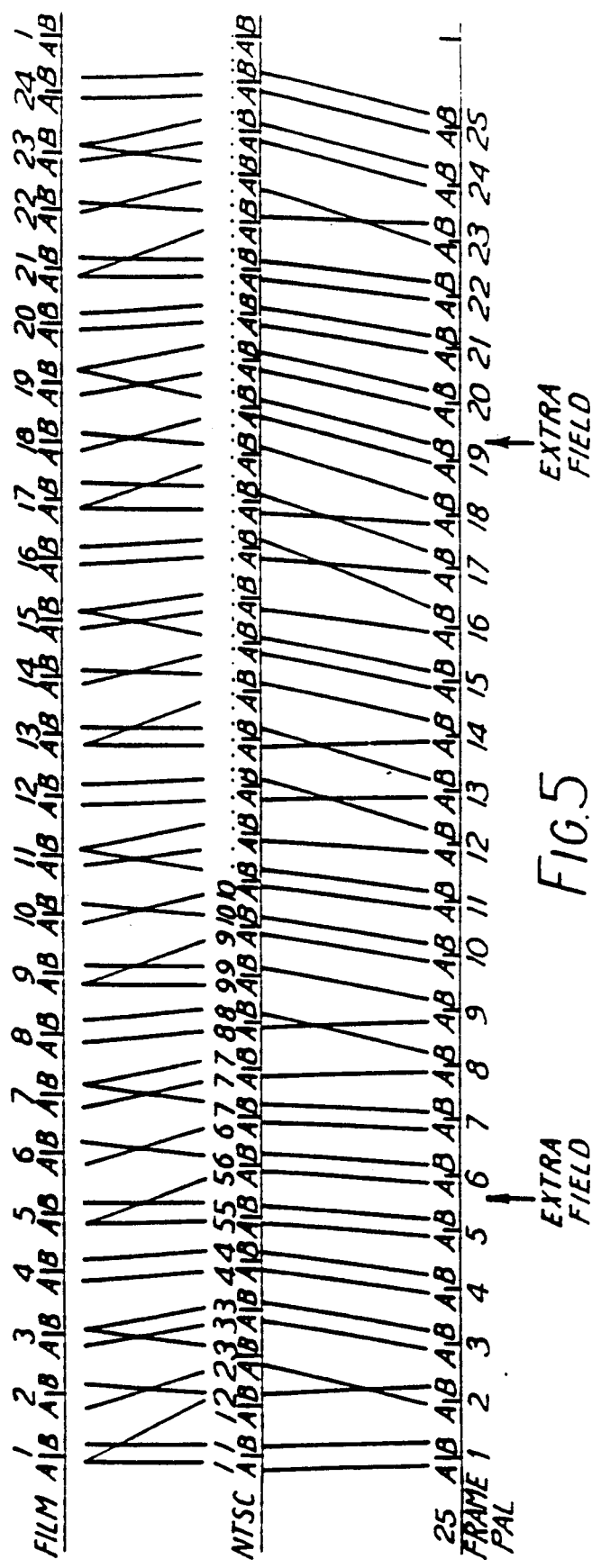

DIGITAL TELEVISION STANDARDS CONVERSION

This invention relates to digital television standards conversion and is concerned, for example, with apparatus and processes for converting an NTSC 525 line/60 fields per second video signal to the PAL 625 line/50 fields per second standard.

Techniques exist for conducting the necessary field and line interpolation to convert from one standard to the other and these techniques operate well with "true" video signals. A difficulty arises, however, with video signals that derive from film material.

It is common practice, particularly in the United States of America, to transfer film shot at 24 frames per second to video tapes on the NTSC standard. Each film frame is scanned twice to produce two interlaced fields and a system known as "3/2 pull down" is used to produce the necessary 30 video frames from the available 24 film frames. The system operates by duplicating selected film fields to produce the necessary additional frames in the video signal. If material produced in this way is passed through a known standards converter to produce a 625/50 signal, the output is degraded as a result of temporal distortions of the duplicated fields. The degree of perceptible degradation will vary according to the visual subject matter of the film and will in many cases be significant.

It is one object of this invention to provide a television standards conversion process for use with a film-originating video signal which overcomes or considerably reduces the importance of this difficulty.

Accordingly, the present invention consists in one aspect in a television standards conversion process for use with film originating video signals, comprising the steps of comparing successive corresponding fields to detect pairs of duplicate fields deriving from the same film frame and eliminating one field of each of said pairs from the video signal.

In another aspect, the present invention consists in a digital television standards converter for use with film-originating video signals, comprising means for comparing fields in successive frames; means for detecting through said comparison duplicate fields deriving from the same film field and means for generating a video output from said video signals with the deletion of said duplicate fields.

Advantageously said means for comparing fields comprises a comparator receiving input video signals mutually delayed by one frame and means for integrating the comparator output over one field.

In one form of the invention, 12 duplicated fields per second are detected and eliminated from a 30 frame per second video signal originating from a 24 frame per second film. Line interpolation is conducted as necessary, in accordance with known line interpolation techniques. It will be understood that a 24 frame video signal produced in this manner and converted, for example, to 625 lines, has fields corresponding one to one with the original film material. In one approach contemplated by this invention, a 625 lines/48 fields video tape produced in this way is reproduced directly on a 625/50 television set using an adapted VTR. In circumstances where the use of an adapted VTR is impractical, this invention contemplates the addition of fields to produce a conventional 625/50 signal.

The ability to produce high quality PAL (for example) video from film originating NTSC video is of considerable commercial importance.

Up until the mid eighties, film was the universal medium for television programme makers wishing to reach an international market. Both 16 mm and 35 mm formats were accepted worldwide as readily transmittable on any television standard. The high cost of film stock and film processing has more recently led to an increased use of video tape for post-production work and editing. It is still usual for programmes and features to be shot on film, but this is transferred immediately to NTSC video tape. When a television programme produced in this way is eventually broadcast under the NTSC standard, there is no difference in picture quality. If, however, the video tape is required to undergo standards conversion prior to broadcasting, there has until now been the likelihood—as mentioned—of significant picture degradation. This has meant that the flexibility and economy of post production and distribution on video, have not been available to producers with overseas markets unless they and their customers have been prepared to accept a drop in picture quality. The present invention enables full advantage to be taken of video tape with quality copies still being available in PAL or other standards for markets outside the USA.

It will be recognised that known techniques for creating video signals from film material, and principally the 3/2 pull down process, generate a pattern of duplicated and reordered fields in the video signal. This pattern will generally repeat after five frames. Using the process and apparatus of the invention described above, the duplicate fields are identified and the "phase" or starting point of the 3/2 process is determined. With this information, the conversion processor can eliminate the duplicate fields and reorder the remaining fields as appropriate. Wherever there is editing of the video signal, the 3/2 sequence of duplication and reordering is of course disturbed. Until the processor is able once again to identify the phase of the 3/2 sequence, there is a risk of visually perceptible distortion being introduced into the video signal. It is an object of a further aspect of the present invention to deal with this difficulty.

Accordingly, the present invention consists in yet a further aspect in a television standards conversion process for use with a film originating video signal, comprising the steps of storing four or more successive fields of the video signal to provide a multi-field delay; comparing successive stored fields to detect duplicate fields deriving from the same film frame; storing and analysing the results of said comparisons for each of the stored fields and converting the video signal downstream of the multi-field delay in response to said analysis by elimination of duplicate fields and appropriate field reordering.

Advantageously, at least eight fields are stored to produce the multi-field delay.

In still a further aspect, the present invention consists in a digital television standards converter for use with film-originating video signals, comprising means for comparing fields in successive frames; a multi-field delay line downstream of said means for comparing fields; sequencer means for analysis of successive outputs of said means for comparing fields and providing an output indicative of the sequence of duplicate fields in said video signals and converter means including means adapted in response to said processor output to eliminate duplicate fields.

It will be understood that the introduction of a delay, preferably of eight fields, before the conversion process takes place gives sufficient time for the motion detector and analyser to identify the 3/2 sequence even where this is disrupted by an editing cut.

In a practical situation, the field comparison or motion detector will not produce a precise zero result for all duplicate fields added by the 3/2 process and a non-zero result for all other fields. There will always be error in the field comparison and the video signal will often contain successive "true" fields which show no movement. The present invention therefore proposes, when conducting the field comparison or motion detection, to produce a numerical value indicative of the difference between the two fields rather than a simple motion/no motion flag. With these comparison results available over a range of fields, the processor has considerably more information available to it and it therefore able more accurately to identify the 3/2 sequence even where there is occasional ambiguity as to whether a particular field is or is not a duplicate added by the 3/2 process.

The 24 "intermediate" video frames generated through decoding of the 3/2 sequence will typically comprise fields of 262 lines. (Whilst it is helpful to refer to these "intermediate" video frames, the skilled man will recognise that there need not necessarily exist an intermediate video signal at any stage of the process.) Line interpolation will be carried out on the intermediate video frames to produce PAL video fields of 312 lines. In the normal situation, with each intermediate video frame consisting of two 262 line fields generated through scanning of the same film frame, it is preferred to treat each intermediate video frame as a single entity, line interpolated to produce two 312 line fields. Thus, the assumption that both fields of the intermediate video frame correspond with the same image, enables the use of a particularly accurate line interpolation procedure. This may be contrasted with standards conversion of true video signals where the correspondence between two fields of a single frame may be no greater than between fields of successive frames. Thus, in line interpolation of a true video signal, there is generally insufficient information in two fields and the line interpolator will typically use information from four or more successive fields. There is accordingly a compromise between spatial and temporal resolution. In the novel method described above, there need be no such compromise. The intermediate video frames may correspond one for one with the original film frames and line interpolation is conducted on essentially a single film frame.

It has been recognised by the present inventors that the assumption of both fields of an intermediate video frame corresponding with the same film image, may occasionally break down if there has been editing of the NTSC video.

It has already been explained that through the appropriate use of field delays, it can be arranged that in the event of a cut in the NTSC video signal, the updated phase information can be available in sufficient time for correct decoding to be re-established quickly after the cut. Preferably, decoding on the new phase information should start immediately after the cut. Also, steps should be taken to ensure that any "artificial" intermediate video frames which consist not of odd and even scans of the same film frame but of the last field in one edited tape sequence and the first field in the succeeding sequence, are identified as such and processed accordingly. It will be understood that since the line interpolation algorithm assumes both fields of the intermediate video frame to represent the same image, the application of this algorithm to a pair of fields which are adjacent only through the coincidence of editing, may produce visually disturbing artefacts.

Accordingly, sequencer means in a converter according to the present invention preferably further comprises cut detector means for detecting cuts in the film originating video signal through a high degree of difference in said compared fields and wherein said converter means is adapted to apply fresh phase information resulting from any such cut at a point in the video signal immediately after said cut.

The invention will now be described by way of examples with reference to the accompanying drawings in which:

FIG. 5 is a diagram corresponding to FIG. 2 and illustrating a modification to the process of the present invention;

Figure 1:
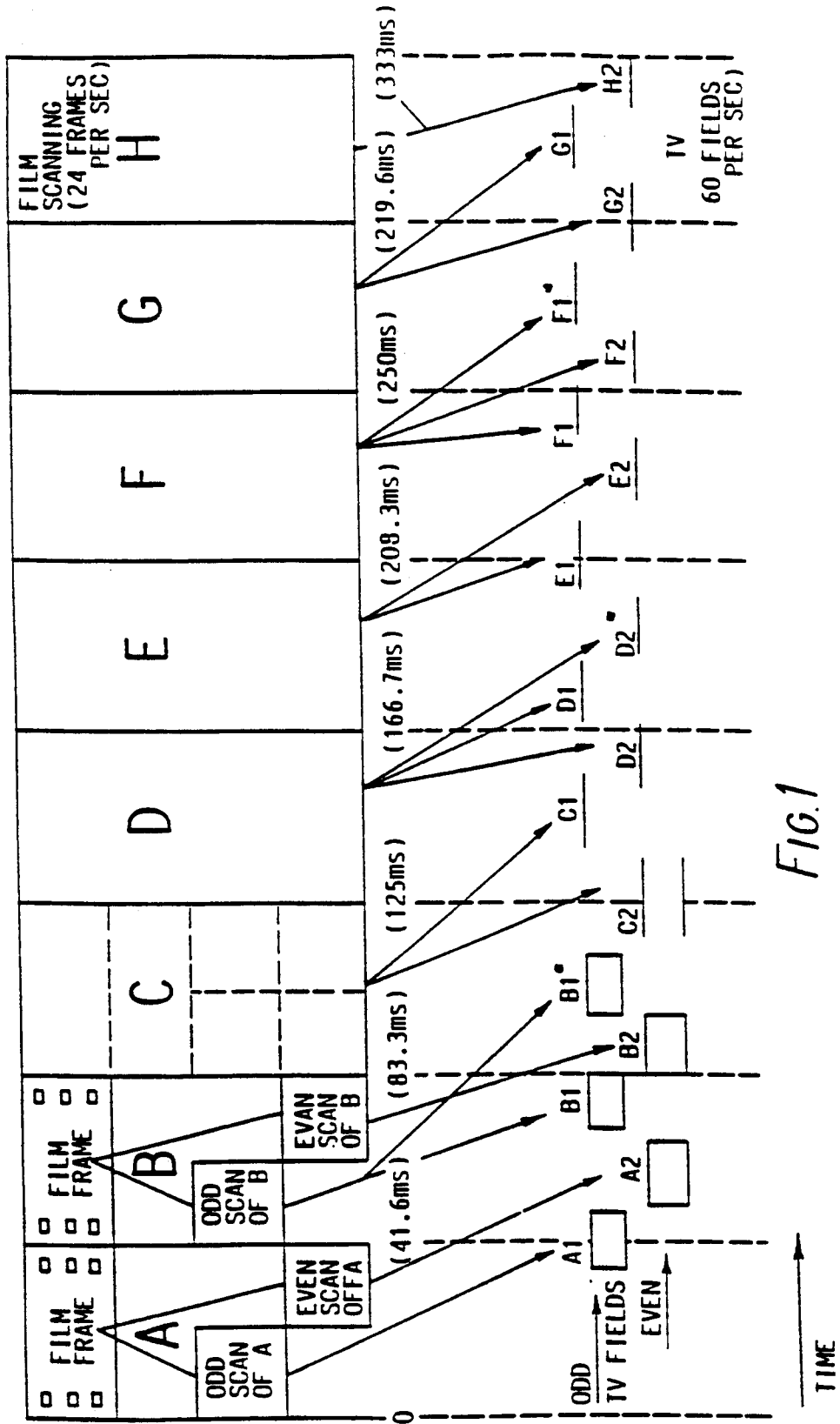
FIG. 1 represents schematically the known "3/2 pull down" process for producing a 60 field per second video signal by scanning a film shot at 24 frames per second.

The conventional "3/2 pull down" system is illustrated in FIG. 1. Each film frame is scanned twice to produce interlaced fields. Thus film frame A is scanned to produce field A1 of odd lines and field A2 of even lines. With alternate film frames, a field is duplicated and used with the appropriate field from the next succeeding film frame to produce an additional video frame. Thus, looking at FIG. 1, film field B1 is duplicated to produce video fields B1 and B1*. Video field B1 interleaves with corresponding field B2 whilst duplicated video field B1* is matched with field C2. Video field C1 is matched with video field D2 whilst video field D1 is matched with a duplicate field D2*.

It will be seen that four film frames, A, B, C and D, have been utilised to produce five interlaced TV frames, A1:A2, B1:B2, B1*:C2, C1:D2, and D1:D2*. In this way, a 60 field per second (30 frame per second) video signal is produced from the 24 frame per second film.

It has previously been described how use of conventional NTSC to PAL conversion techniques on a video signal produced in this way will lead to a degraded image. A conversion process can be regarded as a resampling at new field and line rates of a notional signal of which the incoming video signal is presumed to be a sample at the existing line and field rates. With an incoming video signal having duplicated frames, it will be seen that the sampling assumption breaks down and so it is not unexpected that degradation of the image is observed.

Figure 2:
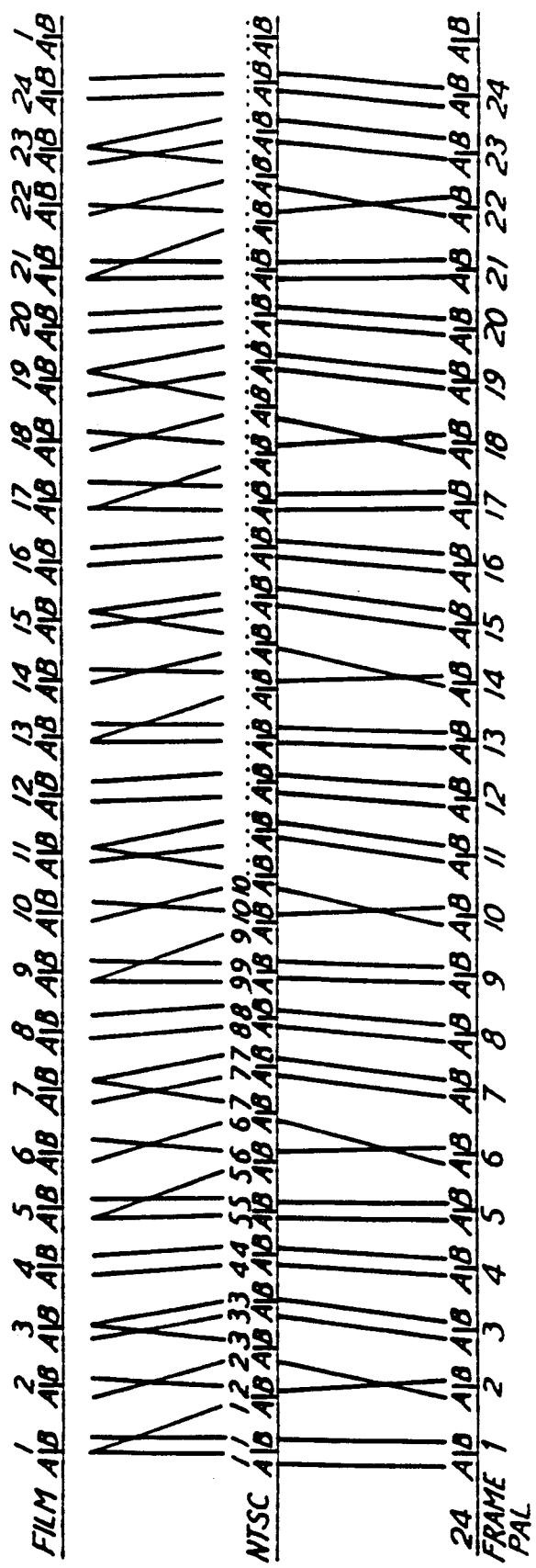
FIG. 2 illustrates schematically a process according to the present invention.

The present invention operates by removing the duplicated fields, that is to say the asterisked fields, from the NTSC signal. There is shown in FIG. 2, a representation on the centre line, of 30 frames of an NTSC signal. There is also shown on the upper line the origin of these frames using the 3/2 pull down system as described with reference to FIG. 1. The present invention operates in one form to produce a 24 frame PAL signal as shown on the lower line. In this diagram, the successive frames are referenced numerically.

It will be seen, for example, that duplicate field 1odd is eliminated with field 2-even being recombined with field 2-odd. The next duplicate field 3-even is eliminated and the frames 3-odd, 3-even and 4-odd, 4-even remain unchanged. With the continuation of this process it will be recognised that a 24 frame signal is produced having a field on field match with the original film material.

The apparatus used in one embodiment of the present invention will be described with reference to FIGS. 3 and 4.

Figure 4:
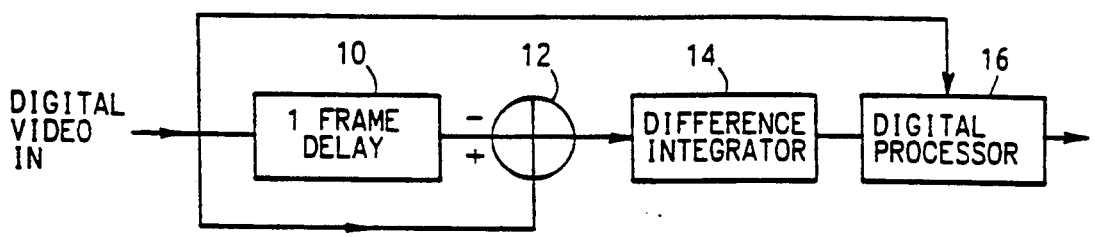
FIG. 4 illustrates one portion of apparatus according to one embodiment of the present invention.

As shown in FIG. 4, the incoming video signal is passed, through a frame delay 10, to a comparator 12. This comparator 12 also receives the undelayed video signal. The output of the comparator is integrated in difference integrator 14 which passes an output to digital processor 16. This digital processor also receives the incoming video signal.

Figure 3:
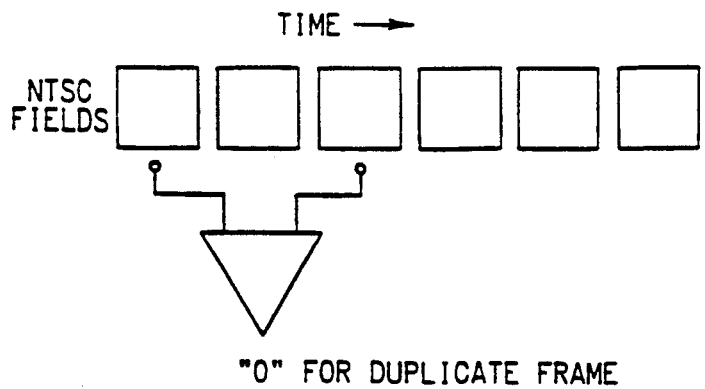
FIG. 3 is a diagrammatic representation of a comparison step according to the present invention.

In operation, each incoming field is compared with the corresponding field of the preceding frame as shown schematically in FIG. 3. In the case of a duplicated field, there will in theory be a zero difference signal integrated over the field and the digital processor is accordingly able to detect duplicated fields. In accordance with the strategy illustrated in FIG. 2, one of each pair of duplicated fields is eliminated and the remaining fields arranged, where necessary, to repeat the original field sequence of the film material. For this purpose, the apparatus includes a number of field stores, typically four.

It will be understood that since the duplicated fields are detected electronically on the basis of a lack of motion between succeeding frames, no reliance is placed on a unchanging field structure in the incoming video signal. Where there are inevitable discontinuities in the field structure, due for example to video tape editing or a break in the film scanning process to change spools, the process according to the invention will, within a few number of fields, recommence its detection of duplicate frames. If this introduces a perceived irregularity in the image, additional field delays can be introduced enabling apparatus according to the invention effectively to "look ahead" beyond a video tape cut. This option will be discussed more fully below.

It will be possible to produce an adapted VTR to record the 24 fps PAL signal in such a manner as to permit replay of the video tapes on conventional equipment at 25 fps. There will be an inevitable 4% decrease in running time but this will in most cases be of no import. The viewed image will be a totally faithful reproduction of the original film material with no possiblity of artefacts deriving from field interpolation.

An alternative procedure, illustrated in FIG. 5, enables direct viewing of a coverted PAL signal on conventional equipment. The centre an upper lines of FIG. 5 are identical with that of FIG. 2. The lower line shows a modification in that an additional field is inserted every 12 fields. Thus, duplicate frame 5-odd is in this case not eliminated, neither is duplicate frame 19-even.

Further, an additional field is inserted every 1000 fields to allow for the fact that the field rate in the NTSC system is not precisely 60 fields per second but in fact 59.94. A 25 frame PAL signal produced in this way has minor discontinuities but these are likely to be perceptible only in unusual situations such as smooth pans with no subject movement.

It will be understood that in addition to the processing of fields described above, line interpolation will be required in a coversion from 525 to 625. This may take a varity of conventional forms and detailed description here is unnecessary.

Figure 6:
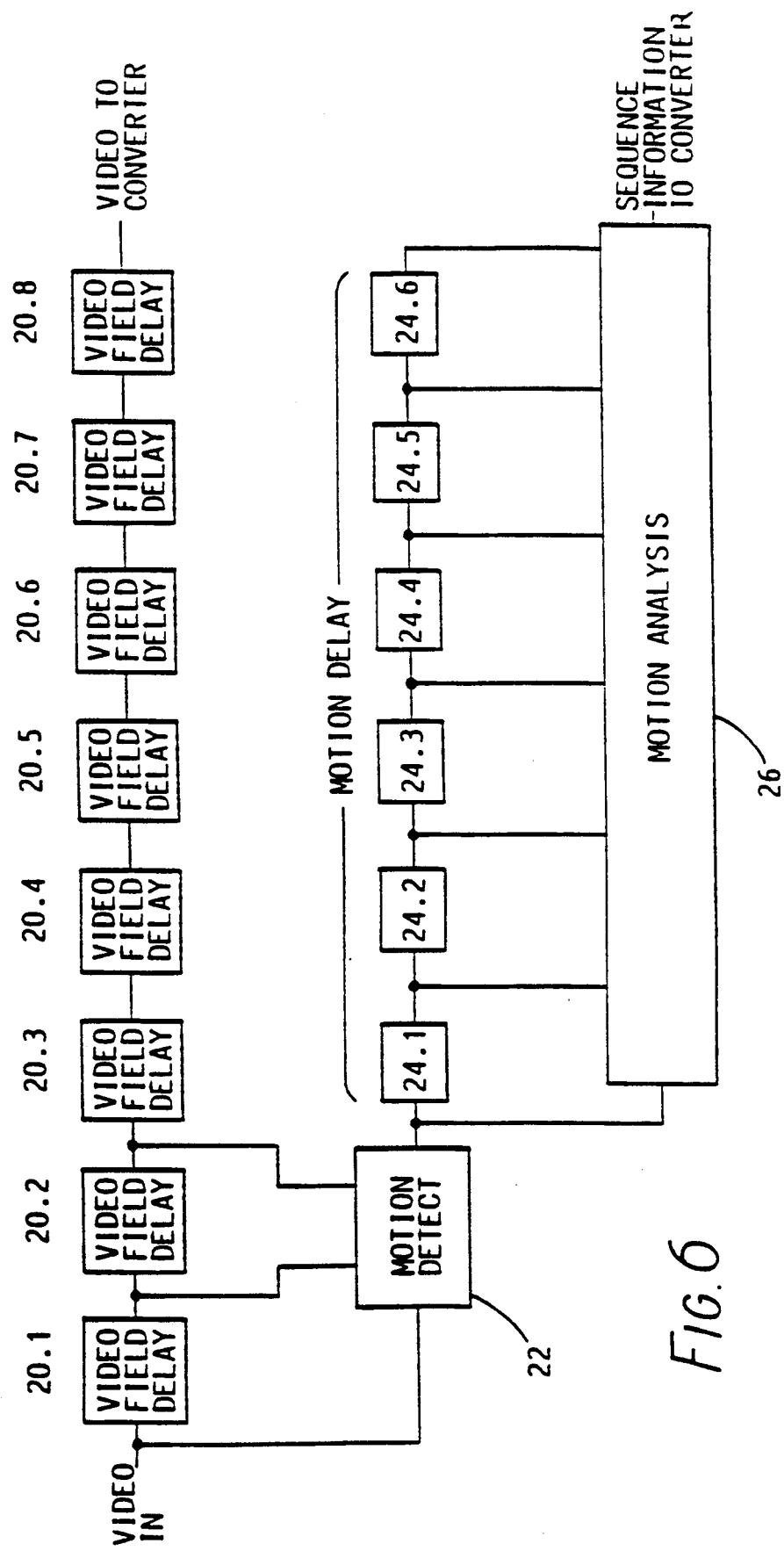
FIG. 6 illustrates one portion of apparatus according to a further embodiment of the present invention.

Referring now to FIG. 6, there is illustrated apparatus according to a further embodiment of the present invention. The input video signal is passed through a chain of eight viedo field delays 20.1 to 20.8 before passing to the converter (not shown). A motion detector 22 receives inputs from the video line and the output of video field delays 20.1 and 20.2 and produces a numerical output indicative of the degree of difference between successive, corresponding fields in the interlaced field structure. The output of motion detector 22 is passed through a chain of motion delay elements 24.1 to 24.6 with the value at each point in the dealy chain being made available to a motion analysis unit 26. This motion analysis unit 26 provides an output to the converter. This motion analysis unit is adapted to identify form the delayed motion detection values, the phase of the 3/2 sequence.

In theory, there wil be a regular sequence of null motion values over a five field interval. (The skilled man will appreciate that the interval over which the correlation is precise in all respects is in fact five frames, but the sequence is apparent from five fields). As has been discussed above, the detection results are unlikely always to be zero and there will also on occasion be null—or very low—motion detection values arising naturally from the film material. The motion analysis unit 26 is therefore adapted to calculate from the information available to it, the most likely phase of the 3/2 sequence. That is to say the closest match between the measured values and the theoretical sequence of null values. This information is passed to the converter to enable the duplicate fields to be eliminated, as with the previous embodiment.

Since the motion detection is carried out at a point early in the field delay chain, the motion analysis unit is able to operate several fields in advance of the conversion process. This means that where there is a sequence change, the motion analysis unit is likely to have correctly identified the fresh sequence before fields corresponding to that new sequence "arrive" at the converter. The risk of a loss of resolution at a sequence break is therefore very much reduced.

With the additional information available in accordance with this embodiment of the present invention, the converter is able to make additional choices to optimise the conversion process. Thus, for example, the converter may select which of two duplicate fields are to be eliminated. To simplify the re-ordering procedure, for example, it might be convenient at one point in the 3/2 sequence to eliminate the first of a duplicate pair of fields, and at another point in the sequence, the second. In certain cases no field will be eliminated as such, the conversion process will simply take into account the fact that the fields contain duplicated information.

It will be possible to arrange that, in the event of a shift in the 3/2 sequence—typically through an editing cut—the fresh phase information begins to be used at the most likely point of the editing cut. Preferably, the exact position of the cut is determined so that decoding with the new phase information begins immediately after the cut. Also, steps are preferably taken to ensure that a frame having fields from either side of a cut, is not treated in the same manner as a normal decoded frame. It has previously been explained that failing to distinguish such "artificial" video frames can lead to undesirable visual artefacts.

The manner in which these preferred features are provided, will now be described with reference to FIG. 7. This plots the results of the motion detection analysis or field comparison that is conducted between corresponding fields of successive frames. It should be noted parenthetically that it may in certain cases be desirable to compare successive fields as well as fields of successive frames, to provide for any video sequences among the film originating material.

Figure 7:
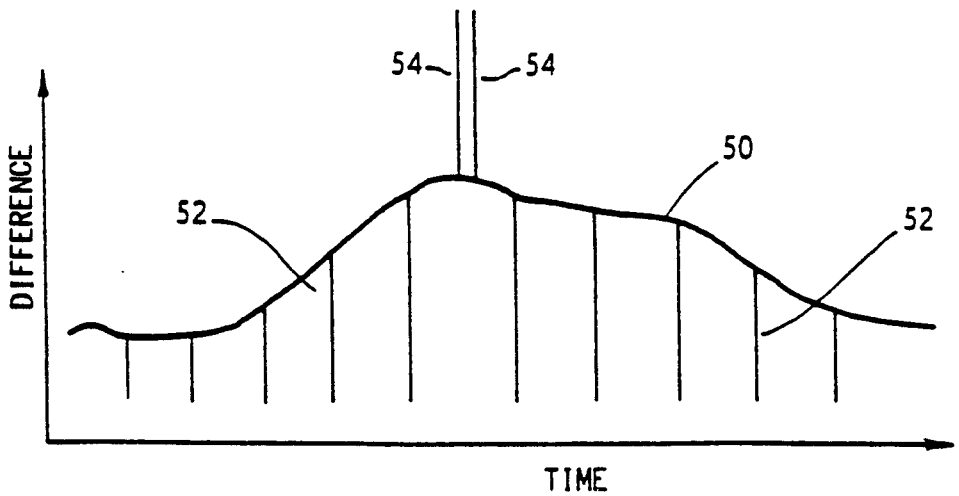
FIG. 7 is a plot illustrating the results of a field comparison performed in one embodiment of the present invention.

FIG. 7 shows at 50 the generally smooth envelope of the difference between film frames that would be expected in a typical field sequence. At regular intervals, the plot of field difference will drop sharply towards zero, this being shown for example at 52. As has been explained, this arises from the field duplication in a five frame sequence of the 3/2 procedure. At a video cut, in addition to a phase change (most probably) in the 3/2 sequence, there will be expected a larger than average difference between fields. This is shown for example at 54. Detection of this increased difference signal enables the exact point of the cut to be determined, enabling decoding of the new 3/2 sequence to begin immediately after the cut. Additionally, detection of a cut is used to shift the line interpolation procedure temporarily away from the "normal" mode that has been described, to a "cut" mode. In the cut mode of line interpolation a single field at the cut is employed to construct an entire video frame. Thus a 262 line field is used to provide two 312 line fields. There is an inevitable loss of vertical resolution, but as this appears (necessarily) immediately after a significant picture change, the brief loss of resolution is not visually perceptible.

Figure 8:
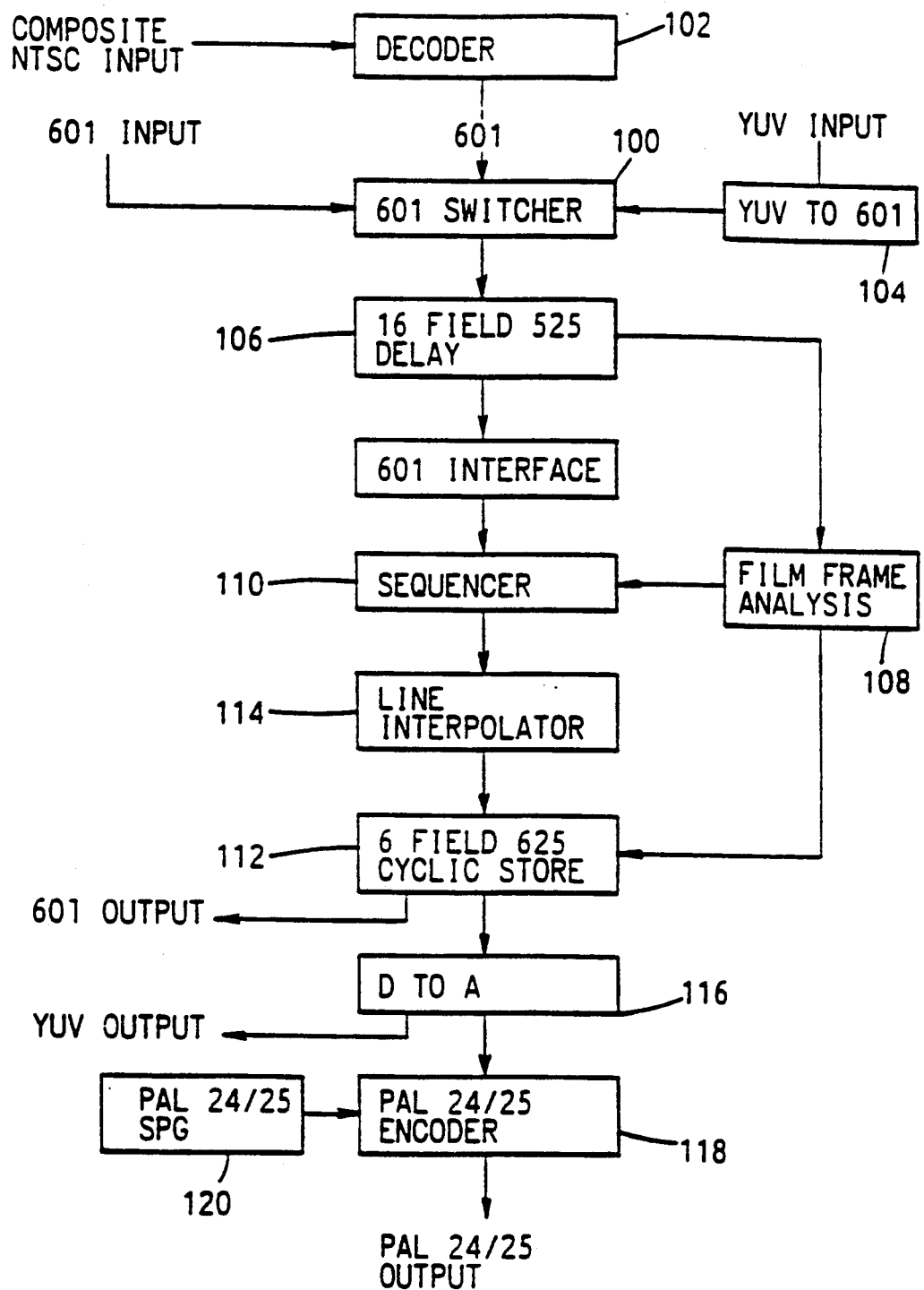
FIG. 8 is a flow diagram illustrating a further process according to the present invention.

A particularly preferred form of the present invention will now be described with reference to the diagram which is FIG. 8.

The illustrated NTSC to PAL standards converter operates with the recognised 601 digital format but can accept video signals in NTSC, YUV or 601 formats. Thus, a 601 switcher 100 is connected to receive inputs from an NTSC decoder 102 and a YUV decoder 104 as well as to receive 601 signals direct. The output of the 601 switcher 100 is passed to a 16 field delay 106. A film frame analysis unit 108 receives comparison information from the delay, in the manner described previously. Outputs from the analysis unit 108 are taken to the sequencer 110 and cyclic field store 112. The sequencer 110 functions as has been described above to identify the 3/2 sequence. This information is available continuously and, because of the delay 106, in real time with the passage of the video signal. Any cuts are identified and fresh sequence information applied immediately after any cut. The output of the sequencer 110 passes to a line interpolator 114 connected in turn with the cyclic field store 112. Together, the line interpolator and cyclic field store construct digital output fields in the PAL standard. The manner in which this is achieved is preferably as described generally in published copending international patent application no. WO90/03705 to which reference is directed. The line interpolation differs from that described in the co-pending application in that, normally, two interlaced fields of an output 625 video frame are constructed by line interpolation of a 525 video frame known (as a result of the actions of the film frame analysis unit 108 and sequencer 110) to derive from a single film frame. In the event of the film frame analysis unit 108 detecting a cut in the input video signal, line interpolation is switched momentarily to a cut mode in which two interlaced fields of a 625 video frame are constructed from a single field of the 525 signal. As has been described above, this avoids the risk of visually disturbing artefacts arising from an attempt to line interpolate from conceptually disparate images.

The output of the cyclic field store 112 is available directly as a 601 output and is also passed to digital-to-analogue converter 116. The output of converter 116 is made available directly as a YUV output and also passes to PAL encoder 118. As mentioned earlier, the apparatus can produce a PAL output 24 or 25 frames per second and appropriate timing signals are taken from sync pulse generator 120.

It should be understood that this invention has been described by way of examples only and a variety of further modifications are possible without departing from the scope of the invention. Thus, for example, whilst the use of eight video field delay units is believed to be preferable, a lesser multi-field delay may offer some advantages. Increasing the multi-field delay to more than eight fields would improve the accuracy with which the motion analysis unit can identify the 3/2 sequence although a much increased number of field delays might prove economically impracticable.

We claim:

1. A television standards conversion process for use with an input film originating video signal, comprising the steps of:
   comparing successive corresponding fields to detect pairs of duplicate fields deriving from the same film frame;
   eliminating one field of each of said pairs from the video signal to leave video frames corresponding one for one with the original film frames; and
   conducting line interpolation on said video frames to provide video fields at a line standard different from that of the input video signal; wherein:
   the step of comparing fields comprises storing at least four successive fields of the video signal to provide a multi-field delay between the step of comparing fields and the step of eliminating one field, in order to look beyond a video tape cut for detection of duplicate fields.

2. A television standards conversion process for use with a 30 frames per second input video signal generated from 24 frames per second film material with a repeating field duplication and reordering sequence, comprising the steps of:
   comparing fields from successive video frames to identify duplicated fields;
   deriving from said identification of duplicated fields continuous phase information concerning the phase in the input video signal of said repeating sequence;
   utilizing said phase information to construct video frames in an output video signal; and
   conducting line interpolation on said frames to provide video fields at a line standard different from that of the input video signal; wherein:

the step of comparing fields comprises storing at least four successive fields of the video signal to provide a multi-field delay between the step of comparing fields and the step of deriving phase information, in order to look beyond a video tape cut for detection of duplicate fields.

3. A digital television standards converter for use with film-originating video signals in a television standard having 525 lines and 60 fields per second, comprising:
means for comparing fields in successive frames;
means for detecting through said comparison duplicate fields deriving from the same film frame;
converter means for conducting line interpolation from 525 to 625 lines; and
means for generating a video output signal at 24 frames per second with the deletion of duplicated fields and with frames corresponding one to one with the original film material.

4. A converter according to claim 3, further comprising a multi-field delay line downstream of said means for comparing fields in successive frames; sequencer means for analysis of successive outputs of said means for comparing fields and providing to said converter means phase information indicative of the sequence of duplicate fields in the video signals.

5. A converter according to claim 4, wherein said sequencer means further comprises cut detector means for detecting cuts in the film originating video signal through a high degree of difference in said compared fields and wherein said converter means is adapted to apply fresh phase information resulting from any such cut at a point in the video signal immediately after said cut.

6. A converter according to claim 3 or claim 4, wherein said converter means comprises line interpolator means functioning to derive two output video fields at a line standard different from that of the film originating video signal through line interpolation of a video frame in said film originating video signal corresponding with a film frame.

7. A television standards conversion process for use with a 30 frames per second input video signal generated at least in part from 24 frames per second film material with a repeating field duplication and re-ordering sequence, comprising the steps of:
comparing fields from successive video frames to identify duplicated fields;
deriving from said identification of duplicated fields continuous phase information concerning the phase in the input video signal of said repeating sequence; and
utilising said phase information to construct in an output video signal 24 video frames per second, corresponding one for one with frames of the original film material.

8. A process according to claim 7, comprising the further step of deriving from each of said output video frames through line interpolation interlaced output video fields at a line standard different from that of the input video signal.

9. A process according to claim 7 or claim 8, wherein the 24 video frame per second output signal is recorded on tape so as to provide through modification of tape speed for viewing on 25 frame per second equipment.

10. A process according to claim 7, further comprising the step of storing at least 4 successive fields of the input video signal to provide a multi-field delay between the steps of identifying duplicated fields and constructing video frames in output video signals.

11. A television standards conversion process for use with film originating video signals, comprising the steps of:
storing four or more successive fields of the video signal;
comparing successive corresponding fields to detect pairs of duplicate fields deriving from the same film frame;
eliminating one field of substantially all of said pairs from the video signal, there being as a result of said field storage a multi-field delay between the steps of comparing fields and eliminating fields respectively; and
conducting line interpolation on said video fields to provide video fields at a line standard different from that of the film originating video signal.

12. The process according to claim 11, wherein said step of eliminating one field of said pairs of duplicate fields results in a video signal having 24 video frames per second corresponding one for one with original film frames.

13. The process according to claim 12, wherein the 24 video frames per second output signal is recorded on tape so as to provide thorough modification of tape speed for viewing at 25 frames per second.

14. The process according to claim 11, wherein said step of eliminating one field from said pairs of duplicate fields results in a video signal having 25 video frames per second.

15. A television standards conversion process for use with a 30 frames per second input video signal generated at least in part from 24 frames per second cinematographic film utilising a repeating field duplication sequence, to produce an output video signal at 25 frames per second, the conversion process comprising the steps of:
comparing fields from successive video frames to identify duplicated fields;
deriving from said identification of duplicated fields continuous phase information concerning the phase in the input video signal of said repeating sequence;
utilising said phase information to construct video frames at 24 frames per second representing a faithful reproduction of said cinematographic film; and
providing through video tape recording and playback at differing speeds an output video signal at 25 frames per second.

16. A television standards conversion process for use with a 30 frames per second input video signal in a first television standard generated through a repeating field duplication sequence from cinematographic film at 24 frames per second, to produce an output video signal at 25 frames per second in a second television standard, the conversion process comprising the steps of:
comparing successive corresponding fields to detect pairs of duplicate fields deriving from the same film frame;
eliminating one field of each of said pairs from the video signal;
arranging fields where necessary to produce a 24 frames per second video signal having a field on field match with the cinematographic film; and
utilising a video tape recorder of adapted tape speed so as to produce an output video signal at 25 frames per second in a second television standard.

17. A process according to claim 13, comprising the further step of conducting line interpolation on said video frames to provide video fields at a line standard different from that of the input video signal.

* * * * *

UNITED STATES PATENT AND TRADEMARK OFFICE
CERTIFICATE OF CORRECTION

PATENT NO. : 5,255,091
DATED : October 19, 1993
INVENTOR(S) : David Lyon et al.

It is certified that error appears in the above-indentified patent and that said Letters Patent is hereby corrected as shown below:

Cover page, at [73] Assignee, "Waterooville" should be -- Waterlooville --;

at [56] References Cited, under OTHER PUBLICATIONS, in the fifth listing, "Eurpope" should be -- Europe --.

Column 3, line 18, "it" (second occurrence) should be -- is --

Column 5, line 11, "1odd" should be -- 1-odd --;
line 64, "an" should be -- and --.

Column 6, line 10, "coversion" should be -- conversion --;
line 16, "viedo" should be -- video --;
line 24, "dealy" should be -- delay --;
line 28, "form" should be -- from --;
line 30, "wil" should be -- will --.

Signed and Sealed this

Twenty-sixth Day of April, 1994

Attest:

BRUCE LEHMAN

*Attesting Officer*   *Commissioner of Patents and Trademarks*